United States Patent [19]

Weaver

[11] 4,015,966
[45] Apr. 5, 1977

[54] MANUFACTURE OF X-RAY ABSORBING GLASS COMPOSITION BY A FLOAT GLASS PROCESS

[75] Inventor: Edward A. Weaver, Toledo, Ohio
[73] Assignee: Owens-Illinois, Inc., Toledo, Ohio
[22] Filed: June 1, 1976
[21] Appl. No.: 691,929
[52] U.S. Cl. .............................. 65/65 A; 65/99 A; 106/52
[51] Int. Cl.² .......................................... C03B 18/02
[58] Field of Search ............. 65/65 A, 99 A, 182 R; 106/52

[56] References Cited
UNITED STATES PATENTS

| | | | |
|---|---|---|---|
| 3,808,154 | 4/1974 | Omori | 106/52 X |
| 3,925,052 | 12/1975 | Hummel | 65/99 A X |
| 3,925,089 | 12/1975 | Houben | 106/52 X |

*Primary Examiner*—Arthur D. Kellogg
*Attorney, Agent, or Firm*—Howard G. Bruss, Jr.; E. J. Holler

[57] ABSTRACT

Disclosed is a technique for melting X-ray absorbing glass compositions by a process wherein molten glass is floated or supported on a bath of molten tin. The X-ray absorbing glass compositions are free of the oxides of lead, arsenic, antimony, bismuth, cadmium, and other readily reducible oxides to prevent discoloration of the glass upon contact with molten metal.

5 Claims, No Drawings

MANUFACTURE OF X-RAY ABSORBING GLASS COMPOSITION BY A FLOAT GLASS PROCESS

In the production of glass intended for use in the manufacture of cathode ray tubes for use in television picture tubes, the glass compositions differs considerably from that utilized in ordinary container or window glass because of the different and critical requirements which such glass must meet. For example, the glass utilized in the construction of faceplates for television picture tubes must have an extremely high electrical resistance because of the high voltages utilized in operation of the tube. This requirement is even more stringent in the case of color television tubes where even more severe conditions exist than do in conventional black and white tubes. The glass faceplate of the tube must also be optically uniform to prevent distortion of the picture. Furthermore the glass faceplate must be reasonably clear at the outset and resistant to discoloration under service.

Another requirement of the faceplate composition is that it must absorb X-rays generated within the cathode ray tube during operation at voltages in the 20,000 to 40,000 volt range or even higher. X-rays are generated within the cathode ray tube by the stream of rapidly moving, high energy electrons from the electron gun. These voltages are sufficiently high to result in the generation of X-rays within the tube.

The absorption of X-ray emission in cathode ray tubes of the type employed in a color television set has been extensively studied in the past and the prior art has proposed the use of lead oxide, barium oxide, or strontium oxide in the glass composition for this purpose. Oxides of arsenic and antimony are commonly used as refining agents in these glasses. U.S. Pat. Nos. 3,607,189; 2,477,329; 3,464,932; 3,805,107; 3,794,502; 3,663,246; 3,627,549; 3,819,972; and 3,808,154 and commonly assigned copending application Ser. No. 571,838 filed 4/25/75 entitled "Zirconia Containing Glass Compositions for Cathode Ray Tubes" are representative of this art.

As an indication of the X-ray absorptivity of a glass composition, it is conventional to measure or calculate the Linear Absorption Coefficient (i.e. LAC) at 0.6 angstroms with a higher LAC indicating higher X-ray absorptivity. For television applications the glass should have an LAC of at least about 26/cm.

The Linear Absorption Coefficient for a specific X-ray wavelength is determined from the mass absorption coefficients of the individual components of the glass. These mass absorption coefficients are known and reported in the literature (see Brewster, Gordon F., Calculated X-ray Mass Absorption Coefficients of Glass Components, J. Am. Ceramic Soc., 35, 194-197 (1952) and Leibhafsky, H. A., et al, X-ray Absorption and Emission in Analytical Chemistry, John Wiley & Sons, Inc. (1960) (Table IV, p. 313).

While these X-rays absorbing glass compositions can be melted and formed by conventional techniques, a problem can sometimes arise in the form of surface discoloration wherein such X-ray absorbing compositions are melted by a process wherein the glass in the molten state is supported or floated on a bath of molten metal such as molten tin.

Float glass processes for conventional soda lime glasses are well known in the art such as represented by U.S. Pat. Nos. 3,674,453; 3,337,322; 3,881,905; 3,305,337; and British Pat. Nos. 893,663 of 4/11/62 and 1,240,491 of 7/28/71, although float glass processes for X-ray absorbing glass compositions have not been reported in the literature. Accordingly it is an object of the present invention to provide a method for the manufacture of X-ray absorbing glasses by the float process.

In attaining the objects of this invention, one feature resides in the process for melting an X-ray absorbing glass composition having an LAC of at least about 26/cm at 0.6A which composition is adapted for use as the faceplate of a cathode ray television tube, wherein a glass batch for said composition is melted to yield a molten glass and the resulting molten glass is floated on a bath of molten tin, wherein said X-ray absorbing glass composition is free of the oxides of lead, antimony and arsenic and consists essentially of:

| Component | % by Weight |
|---|---|
| $SiO_2$ | 60–65 |
| $Al_2O_3$ | 0–5 |
| $Na_2O$ | 2–10 |
| $K_2O$ | 0–17 |
| $CaO + MgO$ | 2–10 |
| $BaO$ | 0–5 |
| $SrO$ | 5–15 |
| $ZrO_2$ | 0–10 |
| $WO_3$ | 0–5 |
| $TiO_2 + CeO_2$ | 0.1–1 |
| $TiO_2$ | 0–1 |
| $CeO_2$ | 0–1 |
| $Fe_2O_3$ | 0–1. |

Preferably these compositions consists essentially of:

| Component | % by Weight |
|---|---|
| $SiO_2$ | 60–65 |
| $Al_2O_3$ | 0.5–5 |
| $Na_2O$ | 5–10 |
| $K_2O$ | 3–10 |
| $CaO + MgO$ | 2–5 |
| $BaO$ | 1–5 |
| $SrO$ | 8–15 |
| $TiO_2$ | 0.1–0.6 |
| $CeO_2$ | 0.1–0.5. |

As is apparent, one of the primary advantages of the present invention is the direct adaptation of the well established float glass process to the manufacture of X-ray absorbing glass compositions without extensive modification of equipment and processing conditions. Furthermore the present invention permits the use of the conventional protective (i.e. inert or reducing) atmospheres that are required to prevent oxidation of the molten tin without having a detrimental effect on the X-ray absorbing glass being made. Such reducing atmospheres also tend to severely discolor conventional X-ray absorbing glass compositions which contain the oxides of arsenic, antimony, and lead.

As used herein the term molten tin also includes alloys of tin in which tin predominates.

It is recognized that the prior art (e.g. commonly assigned U.S. Pat. No. 3,819,972) discloses TV faceplate compositions which are free of PbO, $Sb_2O_3$, and $As_2O_3$, although the main thrust of this patent is towards glass compositions which contain strontium oxide and have improved X-ray absorbing properties and resistance to discoloration under conditions of exposure to X-rays in the cathode ray tube and do not concern float glass melting processes. Other patents concerning X-ray absorbing compositions are U.S. Pat. Nos. 3,808,154; 3,464,932; 2,477,329; 3,422,298; 2,901,366; 3,805,107; 3,794,502; 3,627,549; and Belgium Pat. No. 757,012. In this regard it is emphasized that the present invention is so much not in the X-ray absorbing compositions per se, but rather in the float glass melting process for such compositions and the compositions of the prior art can be adapted to the practice of the present invention.

Prior to the present invention, glass of the soda lime type has been produced by supporting molten glass on molten metal and cooling it to form a flat sheet. Continuous processes for such flat glass production are described in U.S. Pat. No. 3,220,186. It has been known that, in the absence of a protective atmosphere, the molten tin on which glass is floated will oxidize, producing tin oxide or dross. The dross adheres to the glass and causes defects in the glass formed in contact with molten metal. It, therefore, has long been known that a protective atmosphere that is a reducing atmosphere is useful to prevent such oxidation. This is shown, for example, in U.S. Pat. No. 3,241,937 which describes the use of hydrogen with nitrogen as a protective atmosphere over a molten metal pool on which glass may be formed into a flat or sheet form. U.S. Pat. No. 3,337,322 describes the use of protective atmospheres of particular nitrogen or argon compositions which include hydrogen as a reducing gas.

In practice, the present invention can apply these conditions which are required by the nature of molten tin to the float glass manufacture of the X-ray absorbing glass compositions described above. According to this process the sheets can be advanced individually along the molten tin surface in a protective non-oxidizing atmosphere. Alternatively flat glass can be advanced along the molten metal bath in continuous ribbon form in which a ribbon of glass is produced on a molten metal surface from molten glass delivered to the surface at one end of a bath of molten metal to establish a layer of molten glass on the bath. The glass in the layer is advanced partly by momentum and partly by traction effort directly longitudinally of the ribbon developed from the layer, so that the molten glass fed to the bath is converted into continuous ribbon form and advanced under conditions such that it can be removed from the bath.

The glass sheet can then be used to make a flat faceplate or it can then be formed into the desired shape, such as a faceplate for a cathode ray tube, by pressing, sagging, or other conventional forming processes.

The batch composition for preparing the glasses of invention can be selected from conventional fritted and unfritted glass making material such as feldspar, oxides, carbonates, aluminates, sand, lime, limestone, and so forth and do not constitute part of the invention as such. Suitable batch materials for the $ZrO_2$ include zirconium silicate, zirconia, barium zirconia silicate, and calcium zirconia silicate. The particle size of these and the other batch materials are in accordance with conventional glass making practice. Impurities can also enter the composition depending on the source of these compositions provided they do not affect the desired property in the finished glass.

The glass batch materials are melted in a conventional glass making furnace. The molten glass flows from a melting portion of the furnace to a refining or conditioning portion of the furnace, where it is gradually cooled to about 2100° F (i.e. about log 3 viscosity). The glass is then delivered onto a pool of molten tin within an enclosed float-forming chamber. A protective atmosphere of nitrogen and hydrogen can continuously feed into the enclosed float-forming chamber above the glass and molten tin.

The molten glass, upon delivery onto the molten tin, forms a body of molten glass which is cooled and conveyed along the surface of the molten metal to form a sheet or ribbon of glass; which is drawn along the metal and then lifted up from the metal by a lift-out roll. The sheet of glass is then conveyed through a seal and out from the enclosed forming chamber to an annealing lehr.

As will be apparent from the following description, the X-ray absorbing function is achieved without bismuth, cadmium, or lead by using increased proportions of SrO and BaO with or without additional components such as $ZrO_2$ and $WO_3$. These oxides absorb X-rays are not readily reduced upon contact with molten tin. Refining agents such as fluorides, nitrates, and sulfates can be used in place of the arsenic and antimony. Furthermore it has been established that cerium oxide and titanium oxide can be used in the practice of this invention in their conventional small proportions to improve the resistance of the glass to discoloration under X-ray bombardment, although the need for titanium oxide is diminished if not eliminated altogether by the deletion of antimony and arsenic from the composition.

In the Examples that follow all parts are parts by weight, all percentages are weight percentages, and all temperatures are reported in °F unless stated otherwise.

In the exemplary procedures, an inert refractory vessel is partially filled with particulate metallic tin at room temperature. Specimens of the exemplary glass compositions 1 through 5 indicated in Table I in weight % are placed on top of the metallic tin and the vessel containing the tin and the glass is placed in an electrically heated furnace with a protective atmosphere and heated to melt the glass and the tin. In all cases the glass compositions may not total exactly 100% due to minor variations in batching and analysis. The molten glass and tin are then cooled to room temperature and the glass is observed to be essentially clear.

As a further test the glasses indicated in Table II are melted as described above while the temperature is maintained at the temperature indicated in Table II for about one hour and the container and contents are allowed to cool to room temperature. All of the procedures are carried out in the presence of the atmosphere indicated in Table II. At the temperature indicated both the tin and the glass are molten and the molten glass floats on the bath of molten tin.

The results are reported in Table II with the control glasses being included for the purpose of comparison. Control 1 is a typical faceplate composition containing small proportions of PbO, $Sb_2O_3$ and $As_2O_3$, and control 2 being similar to control 1 but containing no PbO. Example 5 is used in this comparative test because it is quite similar to control 1 except for the absence of PbO, $As_2O_3$ and $Sb_2O_3$.

Table I

| Component | Glass Compositions and Properties Glass Number | | | | |
|---|---|---|---|---|---|
| | 1 | 2 | 3 | 4 | 5 |
| $SiO_2$ | 62.4 | 62.4 | 68.2 | 67.6 | 62.9 |
| $Al_2O_3$ | 1.9 | 1.9 | 3.0 | 3.0 | 1.9 |
| $Na_2O$ | 6.9 | 6.9 | 4.6 | 2.2 | 6.9 |
| $K_2O$ | 9.5 | 9.5 | — | 3.4 | 9.6 |
| CaO | 2.8 | 2.8 | — | 1.8 | 2.8 |
| MgO | — | — | — | — | — |
| BaO | 2.2 | 2.2 | — | 4.4 | 2.2 |
| SrO | 10.5 | 12.6 | 15.1 | 8.8 | 13.8 |
| PbO | — | — | — | — | — |
| $WO_3$ | 2.1 | — | — | — | — |
| $ZrO_2$ | 1.0 | 1.0 | 8.9 | 8.9 | — |
| $TiO_2$ | 0.5 | 0.5 | — | — | — |
| $CeO_2$ | 0.2 | 0.2 | — | — | — |
| $Fe_2O_3$ | 0.04 | 0.04 | — | — | — |
| $As_2O_3$ | — | — | — | — | — |
| $Sb_2O_3$ | — | — | — | — | — |
| F | — | — | — | — | — |
| Linear Absorption Coefficient at 0.6 A/cm | 28.6 | 28.6 | 38.6 | 33.4 | 28.4 |

| | 6 | Control 1 | Control 2 |
|---|---|---|---|
| $SiO_2$ | 62.2 | 64.2 | 62.0 |
| $Al_2O_3$ | 3.7 | 1.7 | 1.9 |
| $Na_2O$ | 1.5 | 7.4 | 6.9 |
| $K_2O$ | 15.6 | 8.9 | 9.4 |
| CaO | 1.5 | 2.4 | 2.7 |
| MgO | 1.0 | 0.1 | — |
| BaO | 1.7 | 2.0 | 2.2 |
| SrO | 11.9 | 10.0 | 13.6 |
| PbO | — | 1.9 | — |
| $WO_3$ | — | — | — |
| $ZrO_2$ | — | — | — |
| $TiO_2$ | — | 0.5 | 0.5 |
| $CeO_2$ | 0.9 | 0.2 | 0.2 |
| $Fe_2O_3$ | — | 0.04 | 0.04 |
| $As_2O_3$ | — | 0.15 | 0.17 |
| $Sb_2O_3$ | — | 0.55 | 0.5 |
| F | 0.7 | — | — |
| Linear Absorption Coefficient at 0.6 A/cm | | 26.9 | |

Table II

| Glass | Temp. (°F) | Furnace Atmosphere | Appearance of Glass after Test | Comment |
|---|---|---|---|---|
| Example 5 | 1832 | Helium | clear to faint gray | Satisfactory appearance |
| Example 5 | 1832 | Air | clear to faint gray | Satisfactory appearance |
| Example 5 | 1832 | Nitrogen | clear to faint gray | Satisfactory appearance |
| Example 5 | 1650 | Nitrogen | clear to faint gray | Satisfactory appearance |
| Control 1 | 1832 | Helium | blackish amber | Unsatisfactory appearance |
| Control 1 | 1832 | Air | blackish amber | Unsatisfactory appearance |
| Control 1 | 1832 | Nitrogen | black | Unsatisfactory appearance |
| Control 1 | 1650 | Nitrogen | black | Unsatisfactory appearance |
| Control 2 | 1832 | Helium | blackish amber | Unsatisfactory appearance |

To further illustrate the principles of the present invention, the glass compositions listed on Table III are melted and floated on metallic tin for 20 minutes at 2000° F in an argon atmosphere. The furnace is then turned off and allowed to cool to room temperature overnight. All of the glasses have a LAC of about 28/cm at 0.6 angstroms. The appearance of the resulting glass is noted in Table III.

The glasses are then subjected to an X-ray browning test to simulate conditions experienced in a cathode ray tube. In this test the glass sample is bombarded with X-rays at 40,000 volts for 100 minutes. The resistance of the glasses to X-ray browning can be seen from Table III where the change in absorption at 550 nm before and after exposure to X-ray browning is reported.

Samples of glass compositions are also subjected to the radiation discharged from a carbon arc lamp for 10.5 hours to simulate exposure to sunlight. The carbon arc light is quite rich in ultraviolet and is approximately the equivalent of two weeks to exposure of intense sunlight. After exposure, there was only about a 1% decrease in transmission of the glass compositions throughout the visible spectrum.

For convenience in disclosure all publications and patent documents mentioned herein are incorporated by reference.

Table III

| Component | Glass Number | | | | |
|---|---|---|---|---|---|
| | 6 | 7 | 8 | 9 | 10 |
| $SiO_2$ | 62.9 | 62.9 | 62.9 | 62.9 | 62.9 |
| $Al_2O_3$ | 1.9 | 1.9 | 1.9 | 1.9 | 1.9 |
| $Na_2O$ | 6.9 | 6.9 | 6.9 | 6.9 | 6.9 |
| $K_2O$ | 9.6 | 9.6 | 9.6 | 9.6 | 9.6 |

Table III-continued

| Component | Glass Number | | | | |
|---|---|---|---|---|---|
| CaO | 2.8 | 2.8 | 2.8 | 2.8 | 2.8 |
| BaO | 2.2 | 2.2 | 2.2 | 2.2 | 2.2 |
| SrO | 13.0 | 13.3 | 13.5 | 13.5 | 13.7 |
| PbO | | | | | |
| $TiO_2$ | 0.4 | 0.4 | | | |
| $CeO_2$ | 0.2 | | 0.2 | 0.2 | |
| $Fe_2O_3$ | 0.04 | | 0.04 | | |
| $Sb_2O_3$ | | | | | |
| Appearance after melting | clear | clear | clear | clear | clear |
| X-ray browning test (% Absorption change at 550 nm) | 16 | 45 | 11 | 14 | 23 |

| | 11 | Control 3 | Control 4 | Control 5 |
|---|---|---|---|---|
| $SiO_2$ | 62.9 | 61.7 | 62.8 | 62.2 |
| $Al_2O_3$ | 1.9 | 1.9 | 1.9 | 1.9 |
| $Na_2O$ | 6.9 | 6.8 | 6.8 | 6.8 |
| $K_2O$ | 9.6 | 9.4 | 9.5 | 9.5 |
| CaO | 2.8 | 2.8 | 2.8 | 2.8 |
| BaO | 2.2 | 2.2 | 2.2 | 2.2 |
| SrO | 13.7 | 13.5 | 13.6 | 13.6 |
| PbO | | 2.0 | | |
| $TiO_2$ | | | | |
| $CeO_2$ | | | | |
| $Fe_2O_3$ | | | | |
| $Sb_2O_3$ | | | 1.0 | 1.2 |
| Appearance after melting | clear | dark gray | amber | dark gray |
| X-ray browning test % absorption charge at 550 nm | 39 | | | |

Having thus described the invention, what is claimed is:

1. In the process for melting an X-ray absorbing glass composition having an LAC of at least about 26/cm at 0.6 A which composition is adapted for use as the faceplate of a cathode ray television tube, wherein a glass batch for said composition is melted to yield a molten glass, and the resulting molten glass is floated on a bath of molten tin, the improvement wherein said X-ray absorbing glass composition is free of the oxides of lead, antimony and arsenic and consists essentially of:

| Component | % by Weight |
|---|---|
| $SiO_2$ | 60–65 |
| $Al_2O_3$ | 0–5 |
| $Na_2O$ | 2–10 |
| $K_2O$ | 0–17 |
| CaO + MgO | 2–10 |
| BaO | 0–5 |
| SrO | 5–15 |
| $ZrO_2$ | 0–10 |
| $WO_3$ | 0–5 |
| $TiO_2 + CeO_2$ | 0.1–1 |
| $TiO_2$ | 0–1 |
| $CeO_2$ | 0–1 |
| $Fe_2O_3$ | 0–1. |

2. The process of claim 1 wherein the composition consists essentially of:

| Component | % by Weight |
|---|---|
| $SiO_2$ | 60–65 |
| $Al_2O_3$ | 0.5–5 |
| $Na_2O$ | 5–10 |
| $K_2O$ | 3–10 |
| CaO + MgO | 2–5 |
| BaO | 1–5 |
| SrO | 8–15 |
| $TiO_2$ | 0.1–0.6 |
| $CeO_2$ | 0.1–0.5. |

3. The process of claim 1 wherein said molten glass is maintained in a protective non-oxidizing atmosphere while said molten glass is being floated on said molten tin.

4. In the process for manufacturing X-ray absorbing glass having an LAC of at least about 26/cm at 0.6 A wherein said glass is cooled while being floated on a bath of molten tin to form a dimensionally stable sheet of glass therefrom the improvement wherein said X-ray absorbing glass composition is free of the oxides of lead, antimony and arsenic and consists essentially of:

| Component | % by Weight |
|---|---|
| $SiO_2$ | 60–65 |
| $Al_2O_3$ | 0–5 |
| $Na_2O$ | 2–10 |
| $K_2O$ | 0–17 |
| CaO + MgO | 2–10 |
| BaO | 0–5 |
| SrO | 5–15 |
| $ZrO_2$ | 0–10 |
| $WO_3$ | 0–5 |
| $TiO_2 + CeO_2$ | 0.1–1 |
| $TiO_2$ | 0–1 |
| $CeO_2$ | 0–1 |
| $Fe_2O_3$ | 0–1. |

5. The process of claim 1 wherein said composition consists essentially of:

| Component | % by Weight |
|---|---|
| $SiO_2$ | 60–65 |
| $Al_2O_3$ | 0.5–5 |
| $Na_2O$ | 5–10 |
| $K_2O$ | 3–10 |
| CaO + MgO | 2–5 |
| BaO | 1–5 |
| SrO | 8–15 |
| $TiO_2$ | 0.1–0.6 |
| $CeO_2$ | 0.1–0.5. |

* * * * *